United States Patent Office 2,697,510
Patented Dec. 21, 1954

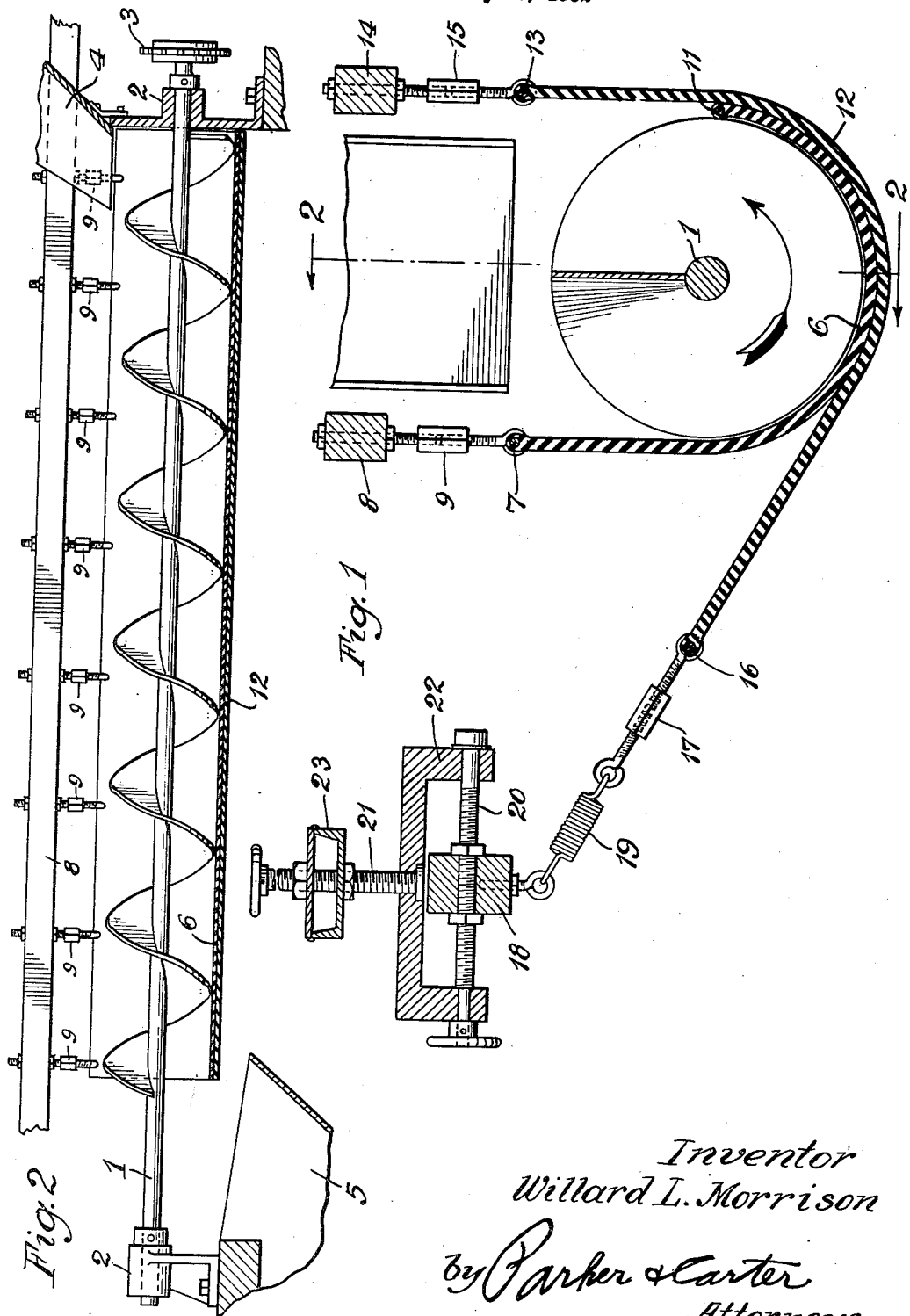

2,697,510

SCREW CONVEYER TROUGH

Willard L. Morrison, Lake Forest, Ill., assignor to Union Stock Yards & Transit Company, Chicago, Ill., a corporation of Illinois Application July 16, 1952, Serial No. 299,141

10 Claims. (Cl. 198—213)

My invention relates to improvements in screw conveyor troughs and has for one object to provide a self-cleaning, screw conveyor trough useful in connection with the conveying of such viscous cake forming solids as raw or digested manure and the like.

Another object of my invention is to provide a flexibly expandible trough for a conveyor screw which will closely engage the screw, which will yield and bend to prevent caking of material on the trough and which will further yield for the passage of solid, incompressible objects which by accident may be mixed with the material being conveyed.

Other objects will appear from time to time throughout the specification and claims.

My invention is illustrated more or less diagrammatically in the accompanying drawings, wherein Figure 1 is a section on a plane perpendicular to the axis of the screw conveyor;

Figure 2 is a section along the line 2—2 of Figure 1.

Like parts are indicated by like characters throughout the specification and drawings.

1 is a screw conveyor shaft supported at both ends in bearings 2 adapted to be driven by any suitable source of power supplied through a sprocket 3 on the end of the shaft. 4 is a feed chute adapted to supply material to the conveyor. 5 is a discharge chute adapted to receive material discharged from the conveyor.

6 is an inner flexible trough element. 7 is a wire reinforced bead along the upper edge of the trough. The bead is suspended from a beam 8 by a plurality of spaced adjustable hangers 9. The upper edge of the inner trough element is fixed and adjustably supported. The trough element is of rubber or rubber-like flexible sheet material and is wrapped about the lower periphery of the conveyor screw as indicated, the screw rotating in the direction of the arrow away from the fixed edge of the trough. The floating edge of the trough is reinforced at 11.

12 is an outer similar trough element reinforced along its upper edge by a wire reinforced bead 13 supported from a beam 14 by a plurality of spaced, adjustable hangers 15 so that the upper edge of the outer trough element is also fixed and adjustably supported. The outer element wraps around the inner element, the lower edge of the inner element terminates approximately at its intersection with a horizontal plane passing through the axis of rotation of the screw. The outer element snugly engages the inner element for a portion of its periphery.

The lower edge of the outer element is reinforced at 16 and supported by spaced turn buckles 17 from beam 18 by springs 19. The beam is vertically and horizontally adjustable, being supported by screws 20 and 21 from abutments 22 and 23 so that the position of the yieldingly supported edge of the outer trough element and the amount of wrap around the inner element may be adjusted. The two trough elements extend beyond the feed chute and terminate just short of the discharge chute so that manure and the like discharged into the trough may be conveyed by the screw conveyor to discharge.

The upper parallel edges of the trough elements extending as they do above the screw define a conveyor trough extending above and enclosing the screw.

The rotation of the screw tends to wrap the inner trough sheet or element around the screw. The yielding support of the outer trough element holds the inner trough element against the screw so that rotation of the screw will always wrap the inner element around the screw. In the event that large particles, bricks, horseshoes and the like may be accidentally discharged with the manure and in the event that such particle is caught between the flight and the trough, the trough may yield, the inner and outer portions or elements sliding on one another to increase the inner diameter of the trough beyond the diameter of the screw whereby such foreign matter may pass along and be discharged by the screw. As soon as such piece of material has passed by, the inner trough will again be urged back toward the screw by the spring supported outer trough and the elements will resume the position shown in Figure 1.

I have shown the lower edge of the outer trough element as spring supported, the lower edge of the inner element floating between the screw and the outer element. Under some circumstances the flexibility and the extensibility of the rubber trough sheets may be sufficient to permit omission of the spring supports. Under other circumstances, a wide range of spring resisted movement may be desired. In either event, however, I have provided a trough which is radially expansible and wherein the two opposed and overlapping trough sections are free to move tangentially with respect to one another to expand and contract so that when excess pressure is applied from the inside, the trough may expand and when such pressure is released, the trough may collapse back to its original size and shape.

A rubber trough such as this pressed inwardly against the screw conveyor tends to assume a somewhat arcuate contour between successive flights and as the screw conveyor rotates, the beginning and end of each such arcuate portion varies in response to change in the point of contact between the edge of the flight and the trough wall. As a result any caking of the material tending to build up on the trough wall will be shaved off by the flight because of the in and out so-to-speak breathing movement of the flexible trough wall.

It has been heretofore proposed to use a single rubber sheet for a trough rigidly supported at each edge and reinforced by rigid supporting means, such as spaced bands and the like. But experience teaches that when such a trough is used, if a solid particle like a horseshoe or a brick becomes wedged between the flexible trough wall and the screw conveyor, such member when it reaches the point of positive support of the trough will be forced through the trough itself. This cannot happen when the support of the trough takes the form of the outer flexible tension member which can yield to permit displacement of the inner trough member but will immediately resume its original position when the need for yielding has passed.

I claim:

1. A screw conveyor including a screw, a trough comprising two flexible rubber-like sheets wrapped about the underside of the screw, means for supporting the upper edges of both sheets above the screw, the lower edge of the inner sheet being floatingly held between the screw and the outer sheet.

2. A screw conveyor including a screw, a trough comprising two flexible rubber-like sheets wrapped about the underside of the screw, means for supporting the upper edges of both sheets above the screw, the lower edge of the inner sheet being floatingly held between the screw and the outer sheet, the lower edge of the outer sheet being yieldably and adjustably supported whereby the two sheets are free to slide tangentially upon one another when yielding to radial pressure.

3. A screw conveyor including a screw, a trough comprising two flexible rubber-like sheets wrapped about the underside of the screw, means for supporting the upper edges of both sheets above the screw, the lower edge of the inner sheet being floatingly held between the screw and the outer sheet, the lower edge of the outer sheet being yieldably supported whereby the two sheets are free to slide tangentially upon one another when yielding to radial pressure.

4. A screw conveyor including a screw, a trough comprising two flexible rubber-like sheets wrapped about the underside of the screw, means for supporting the upper edges of both sheets above the screw, the lower edge of the inner sheet being floatingly held between the screw and the outer sheet, the lower edge of the outer sheet being adjustably supported whereby the two sheets are free to slide tangentially upon one another when yielding to radial pressure.

5. A screw conveyor including a screw, a trough comprising two flexible rubber-like sheets wrapped about the underside of the screw, means for supporting the upper edges of both sheets above the screw, the lower edge of the inner sheet being floatingly held between the screw and the outer sheet, the lower edge of the outer sheet being supported whereby the two sheets are free to slide tangentially upon one another when yielding to radial pressure.

6. In combination, a conveyor screw, a flexible non-metallic trough therefor, generally conforming in contour to the lower half of the periphery of the screw and extending upwardly generally tangent to the screw above the axis of rotation thereof, adjustable means for supporting the upper edges of the trough, the trough body comprising an inner element having a floating lower edge and an outer element encircling a portion of the inner element and holding the floating edge normally against the screw.

7. In combination, a conveyor screw, a flexible non-metallic trough therefor, generally conforming in contour to the lower half of the periphery of the screw and extending upwardly generally tangent to the screw above the axis of rotation thereof, adjustable means for supporting the upper edges of the trough, the trough body comprising an inner element having a floating lower edge and an outer element encircling a portion of the inner element and holding the floating edge normally against the screw, and adjustable means for yieldingly supporting the lower edge of the outer element.

8. In combination, a conveyor screw, inner and outer overlapping flexible non-metallic trough elements, the opposed edges of like elements extending upwardly and generally tangentially to the screw and means for supporting such edges on opposite sides of the screw, the lower free edge of the inner section being floatingly held in contact with the screw by the outer section.

9. In combination, a conveyor screw, inner and outer overlapping flexible non-metallic trough elements, the opposed edges of like elements extending upwardly and generally tangentially to the screw and means for supporting such edges on opposite sides of the screw, the lower free edge of the inner section being floatingly held in contact with the screw by the outer section, yielding and adjustable means for supporting the lower edge of the outer section for movement toward and from the screw.

10. A trough for screw conveyors comprising two separate flexible rubber-like fabric sheets rigidly supported along their upper edges, one sheet at each side of the conveyor screw and depending downwardly generally tangent to the screw adjacent the level of the axis of rotation of the screw, one sheet being in contact with and wrapped around the screw approximately one hundred eighty degrees, the other sheet being in contact with and wrapped around the first sheet through an angle of approximately ninety degrees, the lower edge of the second sheet being yieldably and adjustably supported whereby the second sheet holds the first sheet against the screw and the friction contact of the screw and the inner sheet tends to draw the inner sheet around the screw.

References Cited in the file of this patent

UNITED STATES PATENTS

| Number | Name | Date |
|---|---|---|
| 1,811,064 | Raney et al. | June 23, 1931 |
| 2,182,680 | Rugg et al. | Dec. 5, 1939 |
| 2,528,679 | Ballard et al. | Nov. 7, 1950 |
| 2,606,645 | Heine | Aug. 12, 1952 |